(12) United States Patent
Han

(10) Patent No.: US 8,347,463 B2
(45) Date of Patent: Jan. 8, 2013

(54) LIMITING STRUCTURE FOR FOLDABLE ELECTRONIC DEVICE

(75) Inventor: De-Zhi Han, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 509 days.

(21) Appl. No.: 12/728,340

(22) Filed: Mar. 22, 2010

(65) Prior Publication Data

US 2011/0002093 A1 Jan. 6, 2011

(30) Foreign Application Priority Data

Jul. 3, 2009 (CN) .......................... 2009 1 0303986

(51) Int. Cl.
*E05D 11/06* (2006.01)
(52) U.S. Cl. ................. 16/374; 16/285; 16/375
(58) Field of Classification Search ............ 16/230–232, 16/258, 267–269, 285, 297, 319, 321, 371, 16/375; 292/1, DIG. 15, DIG. 17, DIG. 61; 361/679.16

See application file for complete search history.

(56) References Cited

U.S. PATENT DOCUMENTS

| | | | | |
|---|---|---|---|---|
| 2,369,148 A | * | 2/1945 | Langhorst | 16/229 |
| 5,896,622 A | * | 4/1999 | Lu | 16/342 |
| 6,085,385 A | * | 7/2000 | Joo | 16/268 |
| 6,170,120 B1 | * | 1/2001 | Lu | 16/342 |
| 6,230,365 B1 | * | 5/2001 | Lu | 16/342 |
| 6,807,712 B2 | * | 10/2004 | Maatta | 16/331 |
| 7,027,846 B2 | * | 4/2006 | Pan | 455/575.3 |
| 7,354,080 B2 | * | 4/2008 | Lee | 292/162 |

* cited by examiner

*Primary Examiner* — Roberta Delisle
(74) *Attorney, Agent, or Firm* — Altis Law Group, Inc.

(57) ABSTRACT

A limiting structure is used for a foldable electronic device including a cover and a body. The limiting structure includes a receiving portion formed in the cover, a latching element, a support element and an elastic element. The receiving portion defines a notch and a holding portion. The latching element is fixed to the body. The support element defines a cutout. The cutout is aligned with the notch. The latching element is received in the cutout and the notch. The elastic element surrounds the support element. The cover is opened relative to the body, and the latching element is latched with the holding portion.

10 Claims, 6 Drawing Sheets

LIMITING STRUCTURE FOR FOLDABLE ELECTRONIC DEVICE

BACKGROUND

1. Technical Field

The present disclosure generally relates to limiting structures and, particularly, to a limiting structure for use in a foldable electronic device.

2. Description of Related Art

Foldable mobile phones generally include a cover and a body rotatably interconnected through a hinge assembly for switching the mobile phone between an in-use position and a closed position. When the mobile phone is opened to the in-use position, a limiting structure will latch the cover to the body to maintain the cover in a selected position. This limiting structure may easily abrade surfaces of the cover and the body affecting appearance of the mobile phone. Another kind of limiting structure is disposed in the hinge assembly but is complicated, making manufacture more difficult.

Therefore, there is room for improvement within the art.

BRIEF DESCRIPTION OF THE DRAWINGS

Many aspects of the limiting structure can be better understood with reference to the following drawings. The components in the drawings are not necessarily drawn to scale, the emphasis instead being placed upon clearly illustrating the principles of the limiting structure. Moreover, in the drawings, like reference numerals designate corresponding parts throughout the several views, in which.

DETAILED DESCRIPTION

Figure 1:
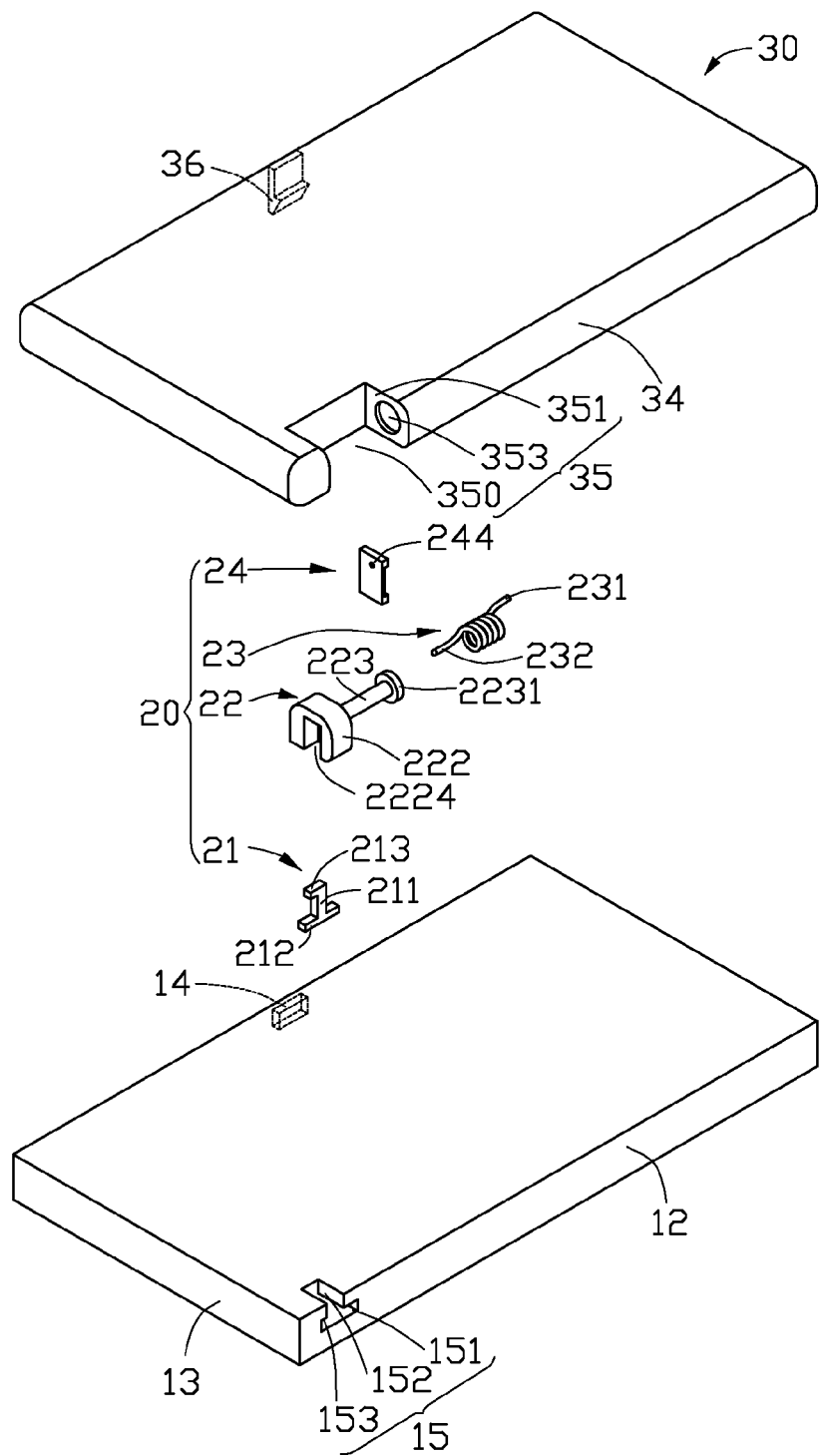
FIG. 1 is an exploded, isometric view of a foldable electronic device employing a limiting structure in accordance with an exemplary embodiment.
Figure 2:
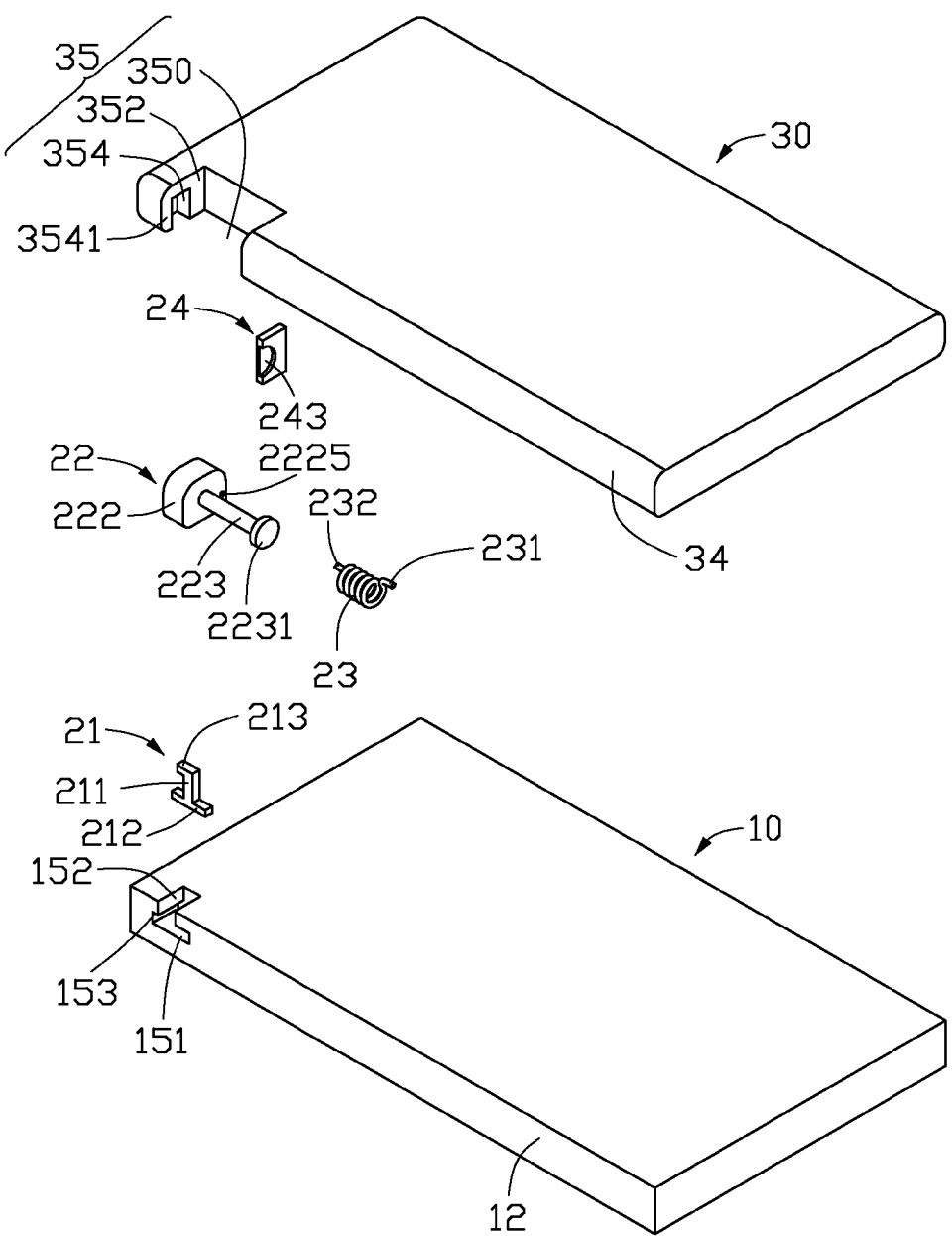
FIG. 2 is similar to FIG. 1, but shown from another aspect.

FIG. 1 shows a foldable electronic device 100, such as a mobile phone, having a limiting structure 20. The mobile phone 100 is an exemplary application, for the purposes of describing details of an exemplary embodiment of the limiting structure 20. The mobile phone 100 includes a body 10 and a cover 30 hinged to the body 10. The limiting structure 20 incorporates a latching element 21, a support element 22, an elastic element 23, and a fixing element 24. The limiting structure 20 allows positioning the cover 30 relative to the body 10 when the cover 30 is opened.

The body 11 may be substantially rectangular, and include two longitudinal side surfaces 12 and two transverse side surfaces 13. The body surface 11 defines a groove 14 at one of the longitudinal side surfaces 12. A receiving groove 15 is defined at the other longitudinal side surface 12. The receiving groove 15 has an offset T-shaped cross section, and includes a first slot 151 and a second slot 152. The second slot 152 communicates with the body surface 11. A stepped wall 153 is defined between the first slot 151 and the second slot 152.

The latching element 21 includes a latching portion 212, a neck portion 211, and a hook 213. The latching portion 212 is engagable in the first slot 151 of the receiving groove 15. The neck portion 211 extends from about a half way point along the length of the latching portion 212, generally forming a T-shape. The hook 213 is disposed at another end of the neck portion 211 opposite to the latching portion 212. The neck portion 211 may extend into the second slot 152, and allow the hook 213 to project from the body 11.

The support element 22 is attached to the cover 30, and includes a positioning portion 222 and a shaft portion 223. The positioning portion 222 defines a cutout 2224 and a first fixed hole 2225. The cutout 2224 communicates with one end of the positioning portion 222. The shaft portion 223 extends out perpendicularly from one side of the supporting portion 222 with the first fixed hole 2225. A flange 2231 is formed at a distal end of the shaft portion 223.

The elastic element 23 may be a helical spring, and includes a first end 231 and a second end 232. The elastic element 23 surrounds the shaft portion 223. The first end 232 is fixed in the first fixed hole 2225 of the support element 22.

The fixing element 24 is substantially a plate, and respectively defines a latching groove 243 and a second fixed hole 244 at two sides thereof. The latching groove 243 is substantially semicircular, with the straight edge aligned with a longitudinal edge of the fixing element 24. The latching groove 243 can receive a portion of the flange 2231.

The cover 30 has a shape substantially corresponding to the body 10, and includes a hinged portion 34 and a clasp 36. The hinged portion 34 is defined at one side of the cover 30. The clasp 36 is formed at the other side of the cover 30. The receiving portion 35 is adjacent to the hinged portion 34. The receiving portion 35 defines an opening 350, and forms a first sidewall 351 and a second sidewall 352. The first sidewall 351 defines a flange hole 353 for receiving remaining portion of the flange 2231. The second sidewall 352 defines a notch 354 and forms a holding portion 3541. One end of the notch 354 communicates with the cover face 31. When the support element 22 is attached to the receiving portion 35, the notch 354 is aligned with the cutout 2224.

Figure 3:
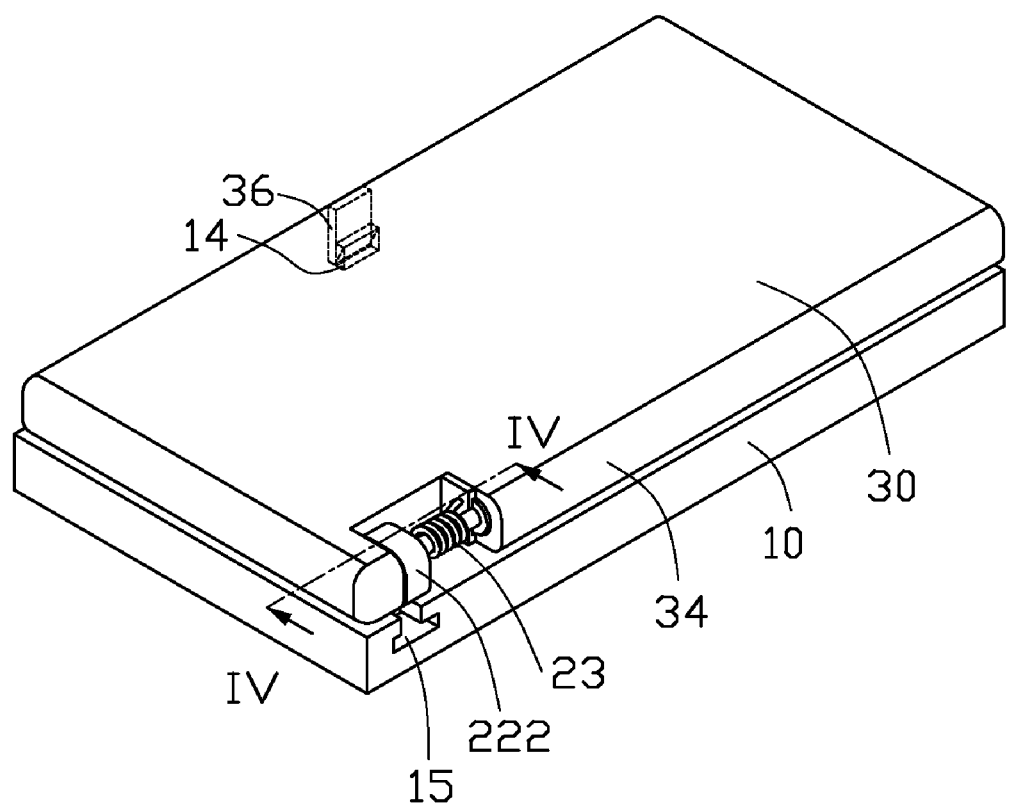
FIG. 3 is an assembled view of FIG. 1.
Figure 4:
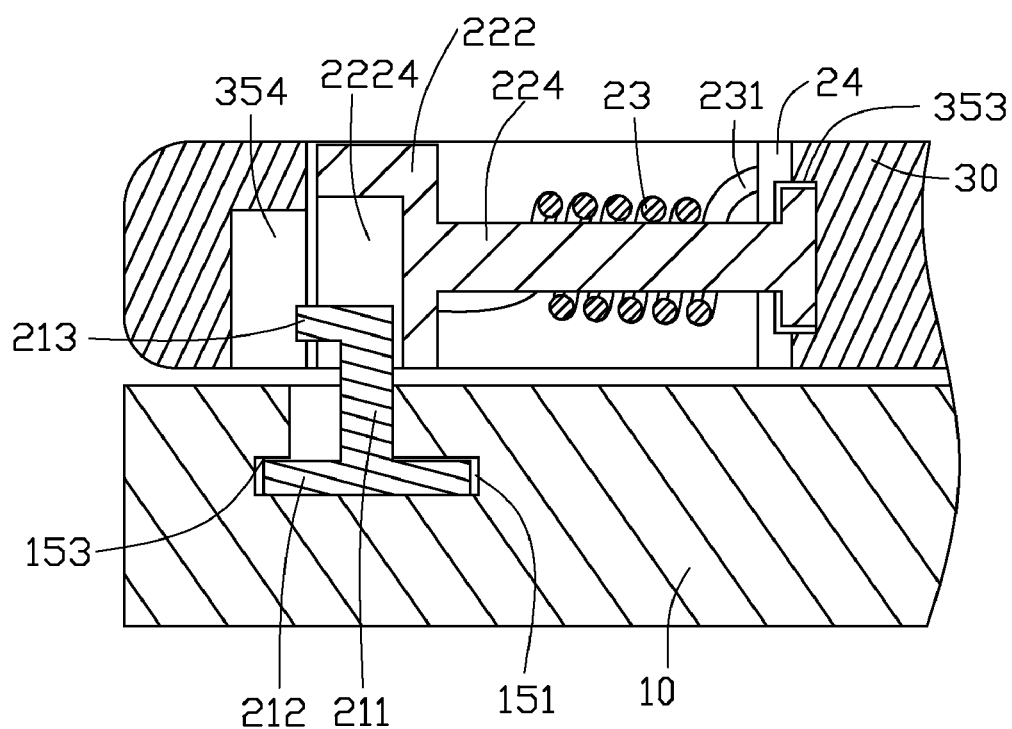
FIG. 4 is a cross sectional view of the limiting structure of FIG. 3 along line IV-IV.

During assembly of the mobile phone 100, referring to FIGS. 3 and 4, first, the elastic element 23 surrounds the support element 22. The first end 231 is fixed to the first fixed hole 2225 of the positioning portion 222. Then, the support element 22 is attached to the receiving portion 35 of the cover 30. The flange 2231 is engaged in the hole 353. The fixing element 24 is fixed to the first sidewall 351 to prevent the flange 2231 from separating from the cover 30. The second end 232 is fixed to the second fixed hole 244 of the fixing element 24. The latching element 21 is received in the receiving groove 15 of the body 10. Then, the cover 30 with the support element 22 is hinged to the body 10. The notch 354 is aligned with the cutout 2224. The hook 213 of the latching element 21 is received in the notch 354 and the cutout 2224. Thus, the limiting structure 20 is assembled in the mobile phone 100.

Figure 5:
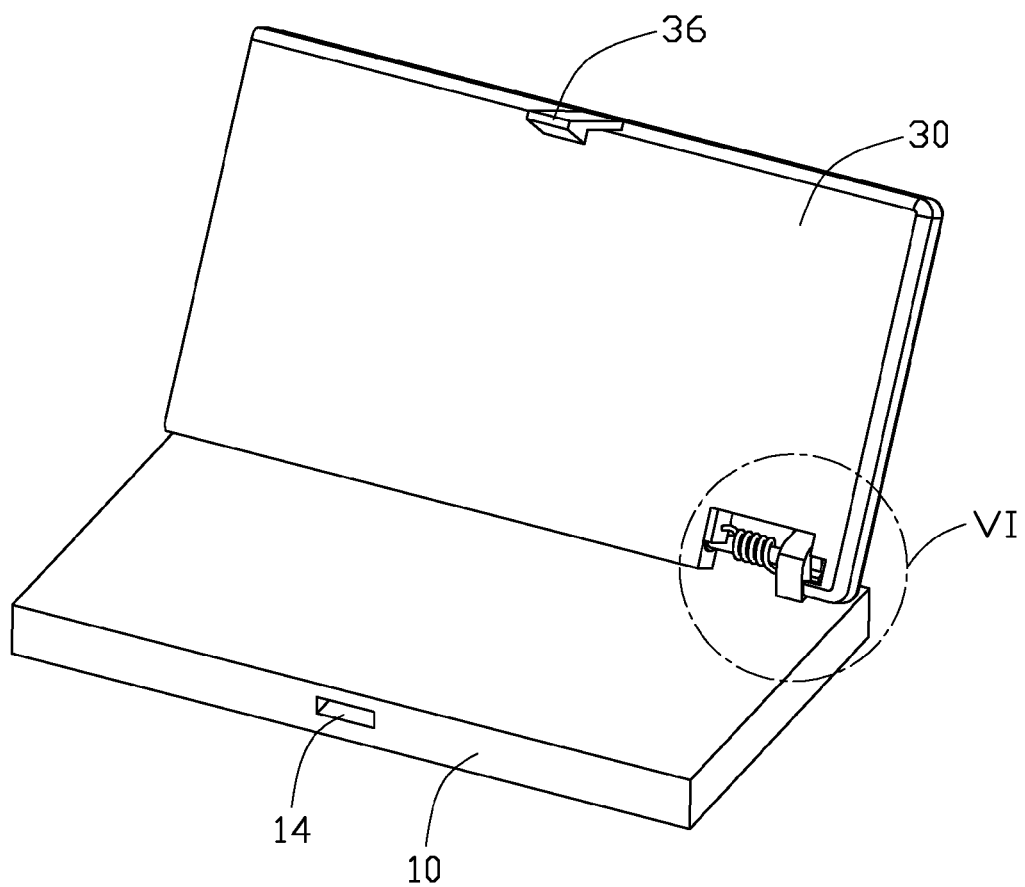
FIG. 5 is an open view of the limiting structure of FIG. 3.
Figure 6:
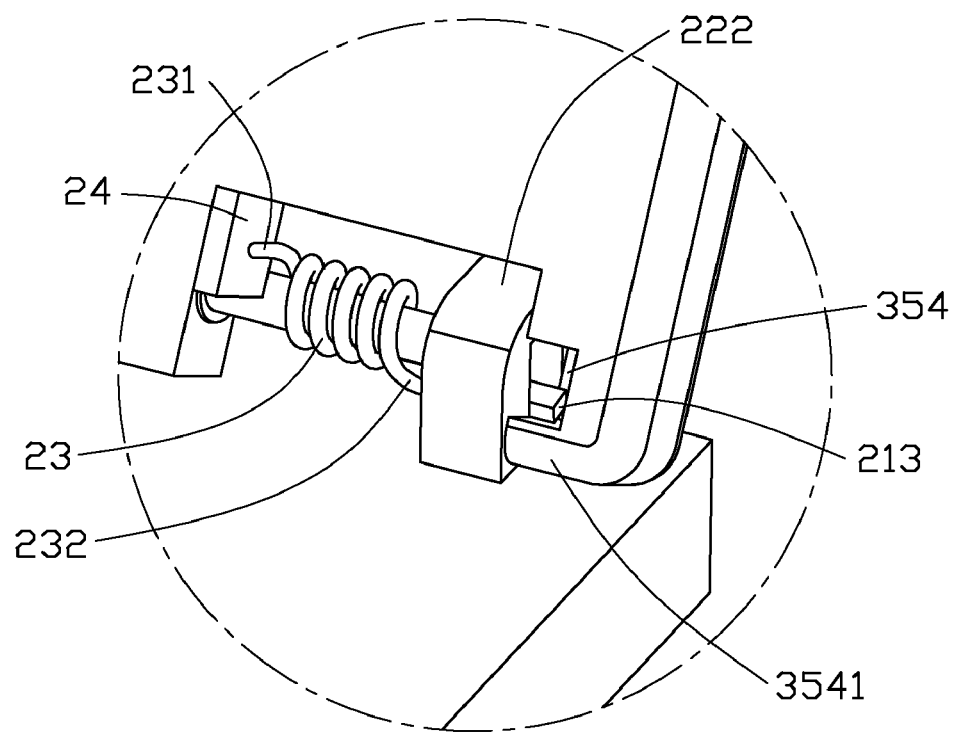
FIG. 6 is an enlarged view of circled portion VI of FIG. 5.

When the cover 30 is opened, referring to FIGS. 5 and 6, the movement of the cover 30 causes the fixing element 24 to rotate. Since the positioning portion 222 is limited by the latching element 21, the support element 22 cannot rotate relative to the cover 30. The notch 354 will be rotated until the hook 213 resists the holding portion 3541. Thus, the cover 30 is limited to a predetermined angle relative to the body 10. When the cover 30 is moved to the closed position, the elastic element 30 rebounds.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A limiting structure for a foldable electronic device including a cover and a body, the limiting structure comprising:
   a receiving portion formed in the cover, the receiving portion defines a notch and a holding portion;
   a latching element fixed to the body;
   a support element including a positioning portion and a shaft portion, the positioning portion defining a cutout; the cutout aligned with the notch, the latching element received in the cutout and the notch, the shaft portion forming a flange at a distal end thereof, the flange being fixed to the receiving portion; and
   an elastic element surrounding the shaft portion of the support element;
   wherein the cover is opened relative to the body, the latching element is latched with the holding portion.

2. The limiting structure as claimed in claim 1, further comprising a fixing element, wherein the fixing element is fixed to the receiving portion, one end of the elastic element is fixed to the positioning portion, the other end of the elastic element is fixed to the fixing element.

3. The limiting structure as claimed in claim 1, wherein the body defines a receiving groove, the latching element includes a latching portion, a neck portion, and a hook, the latching portion and the neck portion are received in the receiving groove, and the hook projects from the receiving groove.

4. The limiting structure as claimed in claim 3, wherein the receiving groove includes a first slot and a second slot, the latching portion is engaged in first slot, the neck portion extends into the second slot.

5. The limiting structure as claimed in claim 3, wherein the neck portion extends from a half way point of the length of the latching portion, generally forming a T-shape, the hook disposed at another end of the neck portion, opposite to the latching portion.

6. A foldable electronic device comprising:
   a body defining a receiving groove;
   a latching element received in the receiving groove;
   a cover forming a receiving portion, the receiving portion defines a notch and a holding portion;
   a support element, the latching element engages with the support element to releasably latch with the holding portion;
   a fixing element; and
   an elastic element surrounding the support element
   wherein the fixing element is fixed to the receiving portion, one end of the elastic element is fixed to the support element, the other end of the elastic element is fixed to the fixing element.

7. The foldable electronic device as claimed in claim 6, wherein the support element includes a positioning portion and a shaft portion, the positioning portion defines a cutout, the elastic element surrounds the shaft portion.

8. The foldable electronic device as claimed in claim 7, wherein the shaft portion forms a flange at a distal end thereof, the flange fixed to the receiving portion.

9. The foldable electronic device as claimed in claim 6, wherein the latching element includes a latching portion, a neck portion, and a hook, the latching portion and the neck portion are received in the receiving groove, and the hook projects from the receiving groove.

10. The foldable electronic device as claimed in claim 9, wherein the neck portion extends from a half way point of the length of the latching portion, generally forming a T-shape, the hook is disposed at another end of the neck portion, opposite to the latching portion.

* * * * *